(12) United States Patent
Au et al.

(10) Patent No.: US 10,180,357 B2
(45) Date of Patent: Jan. 15, 2019

(54) MULTISPECTRAL BAND SYSTEM

(71) Applicant: Honeywell International Inc., Morris Plains, NJ (US)

(72) Inventors: Kwong Wing Au, Bloomington, MN (US); Barrett E. Cole, Bloomington, MN (US); Christopher S. Larsen, Plymouth, MN (US); Sharath Venkatesha, Minnetonka, MN (US)

(73) Assignee: Honeywell International Inc., Morris Plains, NJ (US)

( * ) Notice: Subject to any disclaimer, the term of this patent is extended or adjusted under 35 U.S.C. 154(b) by 97 days.

(21) Appl. No.: 15/258,861

(22) Filed: Sep. 7, 2016

(65) Prior Publication Data
US 2018/0066992 A1    Mar. 8, 2018

(51) Int. Cl.
*G01J 5/00* (2006.01)
*G02B 5/20* (2006.01)
*G01J 5/08* (2006.01)
*G01J 5/20* (2006.01)
*G01J 5/60* (2006.01)

(52) U.S. Cl.
CPC ........... *G01J 5/0018* (2013.01); *G01J 5/0806* (2013.01); *G01J 5/0862* (2013.01); *G01J 5/20* (2013.01); *G01J 5/602* (2013.01); *G02B 5/208* (2013.01)

(58) Field of Classification Search
CPC ........ G01J 5/0018; G01J 5/0862; G02B 5/208
USPC ...................................... 250/339.01
See application file for complete search history.

(56) References Cited

U.S. PATENT DOCUMENTS

| 9,733,129 B1* | 8/2017 | Au ........................... G01J 5/10 |
| 2012/0235042 A1* | 9/2012 | Cole ..................... G01J 5/0018 250/340 |
| 2013/0009062 A1* | 1/2013 | Cole ..................... G08B 17/12 250/342 |

* cited by examiner

*Primary Examiner* — David Porta
*Assistant Examiner* — Gisselle Gutierrez
(74) *Attorney, Agent, or Firm* — Brooks, Cameron & Huebsch, PLLC

(57) ABSTRACT

Devices, methods, systems, and computer-readable media for a multispectral band system are described herein. One or more embodiments include a filter comprising a first designated transmittance value for a first wavelength range and a second designated transmittance value for a second wavelength range, a sensor to receive transmitted radiation from the filter, and a computing device coupled to the sensor to detect any radiation within the first and second wavelength ranges from the received transmitted radiation from the filter and wherein the detected radiation in the first wavelength indicates a particular type of radiation source and detected radiation in the second wavelength range indicates one or more other items within a field of view of the received radiation.

20 Claims, 4 Drawing Sheets

MULTISPECTRAL BAND SYSTEM

PRIORITY INFORMATION

This application is a Non-Provisional of U.S. Provisional Application No. 62/314,191, filed Mar. 28, 2016, the contents of which are incorporated herein by reference

TECHNICAL FIELD

The present disclosure relates to methods, devices, system, and computer-readable media for a multispectral band system.

BACKGROUND

It is desirable to detect flames for early alarming of a fire. A typical method is that of triple-infrared (IR) which involves three detectors: for example, one tuned to the 4.4 µm carbon dioxide emission band line, that is formed when hydrocarbons burn, and the other two tuned to off-band lines, to discriminate between a flame and hot objects. These sensors typically look at a 90 degree field of view, but are not capable of discerning individual sources of radiation within that field of view.

Another approach is to use an imager so that the camera can better discriminate between a flame and hot objects within the field of view. An imager makes it possible to see flames even when there are other hot objects in the field of view that are in different locations.

However, there are several potential problems with such a solution. For example, in some instances, the optics may get coated or an object may be in the way of the field of view. This can impair the viewing of a flame and/or its identification.

It is also desirable to look at objects in the field of view and discern whether these objects are emitted at 4.4 µm which may be an indicator of a flame, rather than just a hot item in the field of view. To do this currently requires the use of a filter wheel, capturing separate images at the desirable spectral bands, but the moving parts associated with such filters can lead to failure.

DETAILED DESCRIPTION

Figure 1:
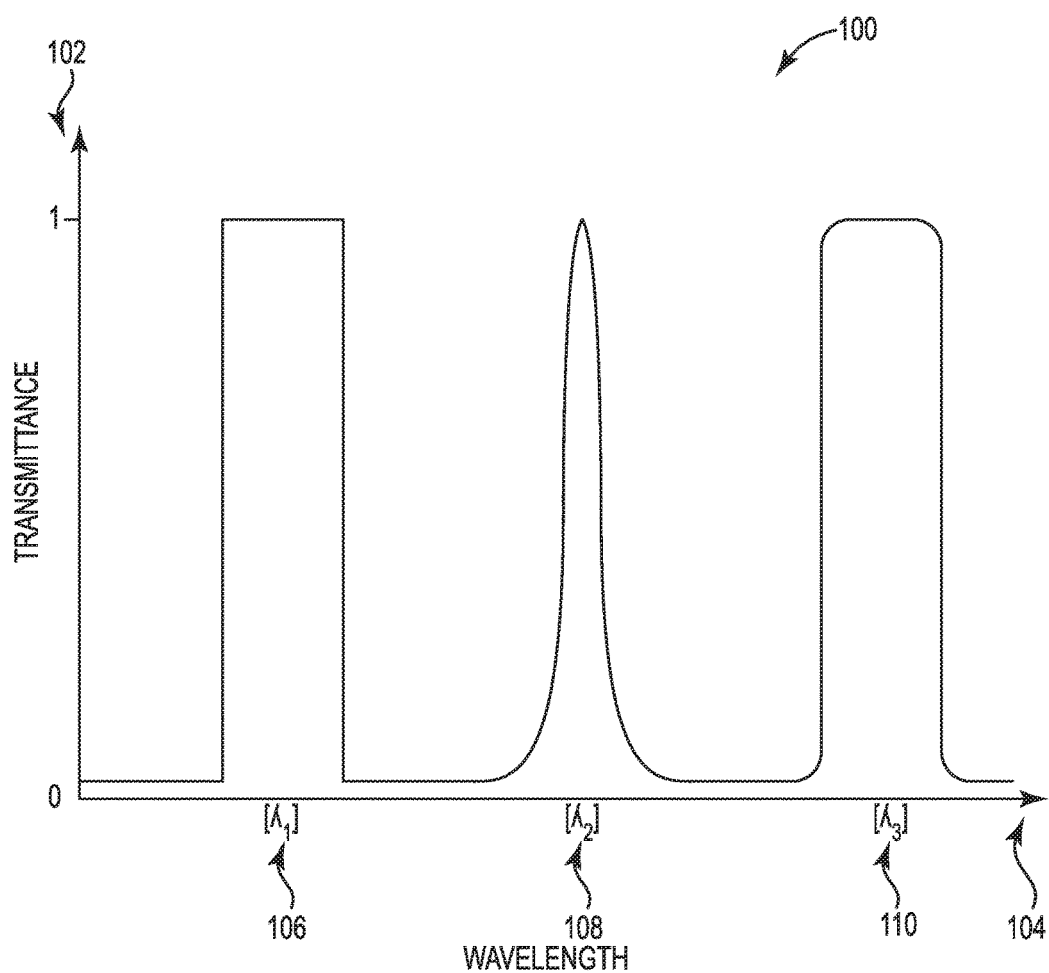
FIG. 1 is an example of a prior art graphical representation of filter response consistent with the present disclosure.

Devices, methods, systems, and computer-readable media for a multispectral band system are described herein. One or more embodiments include a filter comprising a first designated transmittance value (e.g., transmittance attenuation value, etc.) for a first wavelength range and a second designated transmittance value for a second wavelength range, a sensor to receive transmitted radiation from the filter, and a computing device coupled to the sensor to detect any radiation within the first and second wavelength ranges from the received transmitted radiation from the filter and wherein the detected radiation in the first wavelength indicates a particular type of radiation source and detected radiation in the second wavelength range indicates one or more other items within a field of view of the received radiation. In some examples, the sensor can be a bolometer.

The multispectral band system described herein can be utilized in a system for radiation source detection. For example, the multispectral band system can be utilized to receive radiation from an area to detect when there is a radiation source (such as a flame) in the area. In some examples, the filter of the multispectral band system can have a plurality of different designated transmittance values for a corresponding plurality of wavelength ranges. As used herein, a designated transmittance value includes a transmittance value that has been specifically configured for a particular wavelength range of the filter. Previous filters that are utilized for flame detection systems can be a filter wheel with a number of filters, where each of the number of filters have different filter properties. However, the filter of the multispectral band system as described herein can utilize one filter (e.g., entire filter surface, etc.) to filter a plurality of different wavelength ranges instead of utilizing multiple filters to detect a particular wavelength range.

In some examples, the multispectral band system can include a sensor that is coupled to a computing device. In some examples, the sensor can be a camera that provides a high dynamic sensitivity range. In some examples, the sensor can be a bolometer that can include a dynamic sensitivity range of 16 or more bit pixels or values ranging from 0 to 65536 or 0 to more than 65536 respectively. In some examples, the sensor can have a relatively flat response across a broad spectrum of wavelengths. In some examples, the sensor can have a different spectral response across different spectrum of wavelengths (e.g., MWIR region, LWIR region, etc.)

The different transmittance values of the filter, coupled with the spectral response bolometer, of the multispectral band system can utilize a greater range of values of the bolometer compared to previous systems and methods. The different transmittance values of the filter can be configured to yield different intensities for different wavelength ranges.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit corresponds to the drawing figure number and the remaining digits identify an element or component in the drawing. Similar elements or components between different figures may be identified by the use of similar remaining digits.

As used herein, "a" or "a number of" something can refer to one or more such things. For example, "a number of devices" can refer to one or more devices. Additionally, the designator "N", as used herein, particularly with respect to reference numerals in the drawings, indicates that a number of the particular feature so designated can be included with a number of embodiments of the present disclosure.

FIG. 1 is an example of a prior art graphical representation 100 of filter response consistent with the present disclosure. In previous systems and methods a number of filters could be utilized to allow particular wavelengths or wavelength ranges to pass through the number of filters. In some examples, the graphical representation 100 can represent a transmittance of radiation for particular wavelengths utilizing a filter from previous systems and methods.

In some examples, the graphical representation 100 can represent a transmittance value 102 for a number of wavelengths 104. For example, the graphical representation 100 can represent a transmittance value 102 for a first wavelength 106, a second wavelength 108, and a third wavelength 110. In some examples, the first wavelength 106 can be a first wavelength range, the second wavelength 108 can be a second wavelength range, and the third wavelength 110 can be a third wavelength range. In some examples, the first wavelength 106, second wavelength 108, and third wavelength 110 can correspond to wavelength ranges for particular elements or compounds of a detection system. For example, the particular elements or compounds can include elements or compounds that are byproducts of a flame (e.g., water, carbon dioxide, etc.).

In previous systems and methods, the transmittance value 102 for each of the pass bands 106, 108, 110 in wavelengths 104 can be the same or similar transmittance value 102. In some examples, there can be design objectives of the filter. For example, the design objective can include optimizing the transmittance value 102 of all pass bands 106, 108, 110 such that a maximum radiance passes through the filter while undesirable radiance is prevent from passing through the filter. In another example, the design objective can include yielding a uniform transmittance across all pass bands 106, 108, 110.

In previous systems and methods, a filter can be utilized to prevent transmittance of particular wavelength ranges and allow transmittance of other wavelengths. In previous systems and methods, the filter can allow substantially complete transmittance for the first wavelength 106, the second wavelength 108, and the third wavelength 110. It can be difficult to determine a radiance, from the sensed radiance, of a particular wavelength based on the transmittance value 102 of a corresponding wavelength (e.g., first wavelength 106, the second wavelength 108, etc.) since the transmittance is substantially uniform across all bands 106, 108, 110. Thus, previous systems and methods were able to determine that radiation emission from any of the elements or compounds were present based on the sum of radiance of the wavelengths 104, but were not able to determine a particular radiance of the wavelengths 104.

Figure 2:
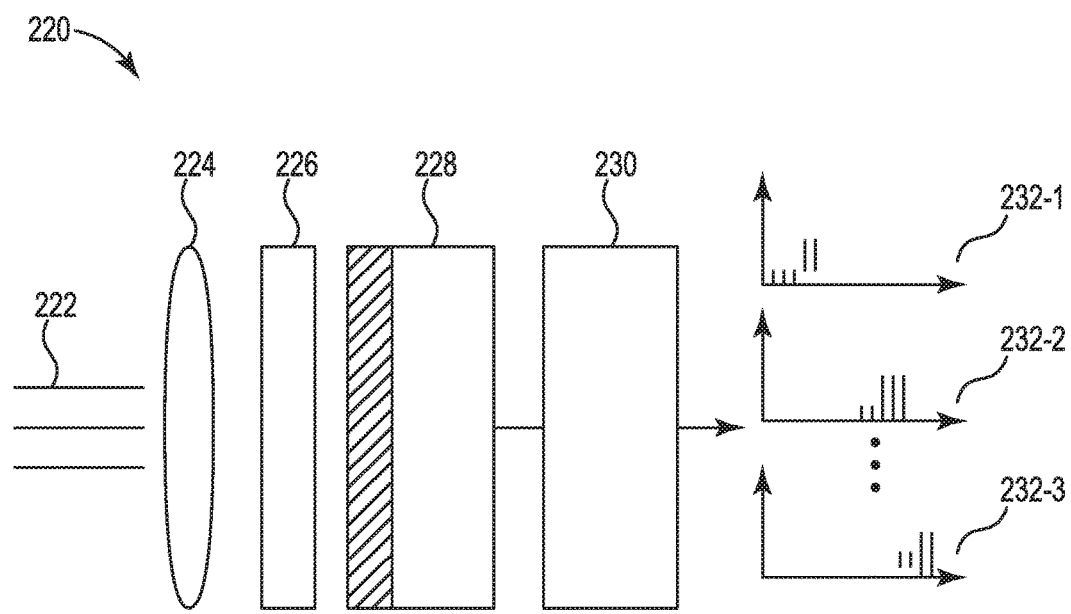
FIG. 2 is an example of a system for a multispectral band system consistent with one or more embodiments of the present disclosure.

FIG. 2 is an example of a system 220 for a multispectral band system consistent with one or more embodiments of the present disclosure. The system 220 can be utilized to detect a radiance of a particular wavelength of a radiation source 222 by utilizing a filter 226 comprising a different transmittance value for different wavelength ranges. In some examples the different transmittance values are known values that can be utilized to calculate a radiance of a number of wavelengths and/or calculate a total radiance of a radiation source 222.

In some examples, the radiation source 222 can be a flame source. For example, the radiation source 222 can be a hydrocarbon fire or a hydrogen fire. In this example, the system 220 can be utilized as a failsafe or fire detection system. In some examples, the radiation source 222 can be a flame source that utilizes a particular fuel source (e.g., excess natural gas, propane, flue gas, etc.). In these examples, the filter 226 can be configured to monitor wavelengths of common and uncommon byproducts of the combustion of the fuel source (e.g., water, carbon dioxide, carbon monoxide, nitrous oxide, etc.) and/or common wavelength ranges for a flame source (e.g., mid-wavelength infrared (MWIR), long-wavelength infrared (LWIR), etc.). In some examples, the system 220 can be utilized as a combustion monitoring system.

In some examples, the system 220 can include a lens 224 to focus the radiation source 222 on the filter 226 and/or sensor 228. In some examples, the lens 224 can be a single element lens or a multiple element lens that is utilized to focus the radiation source 222 from a field of view. In previous systems and methods a lens system may be utilized to split an image of the radiation source 222 into multiple images. However, in some examples, the system 220 does not need a lens system to split an image of the radiation source 222 into multiple images since the filter comprises a different transmittance value (e.g., transmittance attenuation value, etc.) for different wavelength ranges. In some examples, the position of the lens 224 and the filter 226 can be switched so that the lens 224 can focus the filtered radiation from the radiation source 222 on to the sensor 228.

In some examples, the filter 226 can comprises a different transmittance value for different wavelength ranges. For example, the filter 226 can have a first transmittance value for a first wavelength and a second transmittance value for a second wavelength. As used herein, the transmittance value can be a value that represents a quantity of radiation that is allowed to pass through the filter 226. For example, a transmittance value of 1 can represent that 100 percent of radiation at a particular wavelength can be allowed to pass through the filter 226. In another example, a transmittance value of 0.5 can represent that 50 percent of radiation a particular wavelength can be allowed to pass through the filter 226.

In some examples, the system 220 can include a sensor 228. In some examples, the sensor 228 can be utilized to receive the filtered radiation from the radiation source 222. That is, radiation from the radiation source 222 can pass through a lens 224 and be filtered by the filter 226 prior to being received by the sensor 228. In some examples, the sensor 228 can be high dynamic range sensor or camera. In some examples, the sensor 228 can be a bolometer. As used herein, a bolometer can include a sensor for detecting radiation. For example, a bolometer can be utilized to detect radiation in the infrared.

In some examples, the sensor 228 can utilize a number of pixels for sensing and/or capturing images of the radiation from the radiation source 222. In some examples, the sensor 228 can utilize 14 or 16 bit range per sensing element or pixel. In these examples, the sensor 228 can have values ranging from 0 to 16347 for 14 bit pixels and values ranging from 0 to 65535 for 16 bit pixels. In some examples, segments of the values may not be utilized. In these examples, the segments of the values not previously utilized by the sensor 228 can be utilized by the system 220 for determining a radiance of particular wavelength ranges and/or a total radiance of the radiation source 222.

In some examples, the sensor 228 can have a relatively consistent response across the spectrum of wavelengths. For example, the sensor 228 can have a relatively consistent response to a plurality of different wavelengths over a spectrum of wavelengths. In some examples, the sensor 228 can have a response of 3 to 5 microns for MWIR and a response of 8 to 12 microns for LWIR. In some examples, the filter 226 can have a particular spectral pass band within the sensor spectral response. For example, the filter 226 can provide a spectral band between 4.4 and 4.5 microns for hydrocarbon flame detection.

Figure 4:
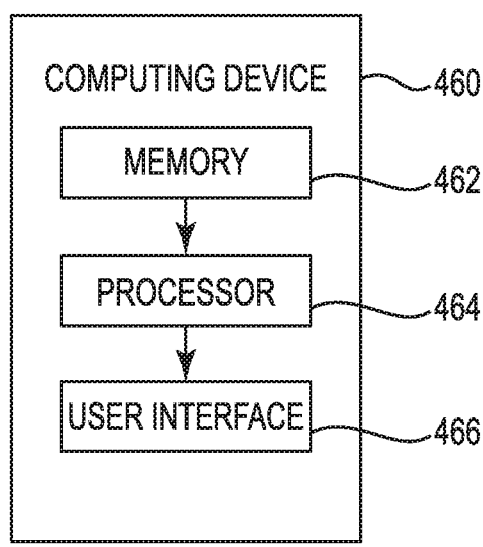
FIG. 4 is an example of a diagram of a device 460 for a multispectral band system consistent with one or more embodiments of the present disclosure.

In some examples, the sensor 228 can be coupled to a computing device 230 (e.g., computing device 460 as referenced in FIG. 4, etc.). In some examples, the computing device 230 can be utilized to generate a number of graphical representations 232-1, 232-2, 232-3. In some examples, the number of graphical representations 232-1, 232-2, 232-3 can correspond to estimated intensities of different wavelength ranges. For example, the graphical representation 232-1 can correspond to a wavelength range of water, the graphical representation 232-2 can correspond to a wavelength range of carbon dioxide, and the graphical representation 232-3 can correspond to a wavelength range of MWIR or LWIR as described herein. In some examples, the different wavelength ranges can correspond to wavelength ranges configured by the filter 226. In some examples, the number of graphical representations 232-1, 232-2, 232-3 can correspond to images of different wavelength ranges.

In some examples, the filter 224 can be configured for four different wavelength ranges. For example, the a first set of wavelengths can correspond to wavelengths emitted by water, a second set of wavelengths emitted by carbon dioxide, a third set of wavelengths can correspond to wavelengths in the MWIR range absence of flame emission, and a fourth set of wavelengths can correspond to wavelengths in the LWIR range. In some examples, the first set and second set of wavelengths can be utilized to test for the existence of a radiation source using the third set as a reference and the fourth set of wavelengths can be utilized as a failsafe for radiation source detection.

Figure 3:
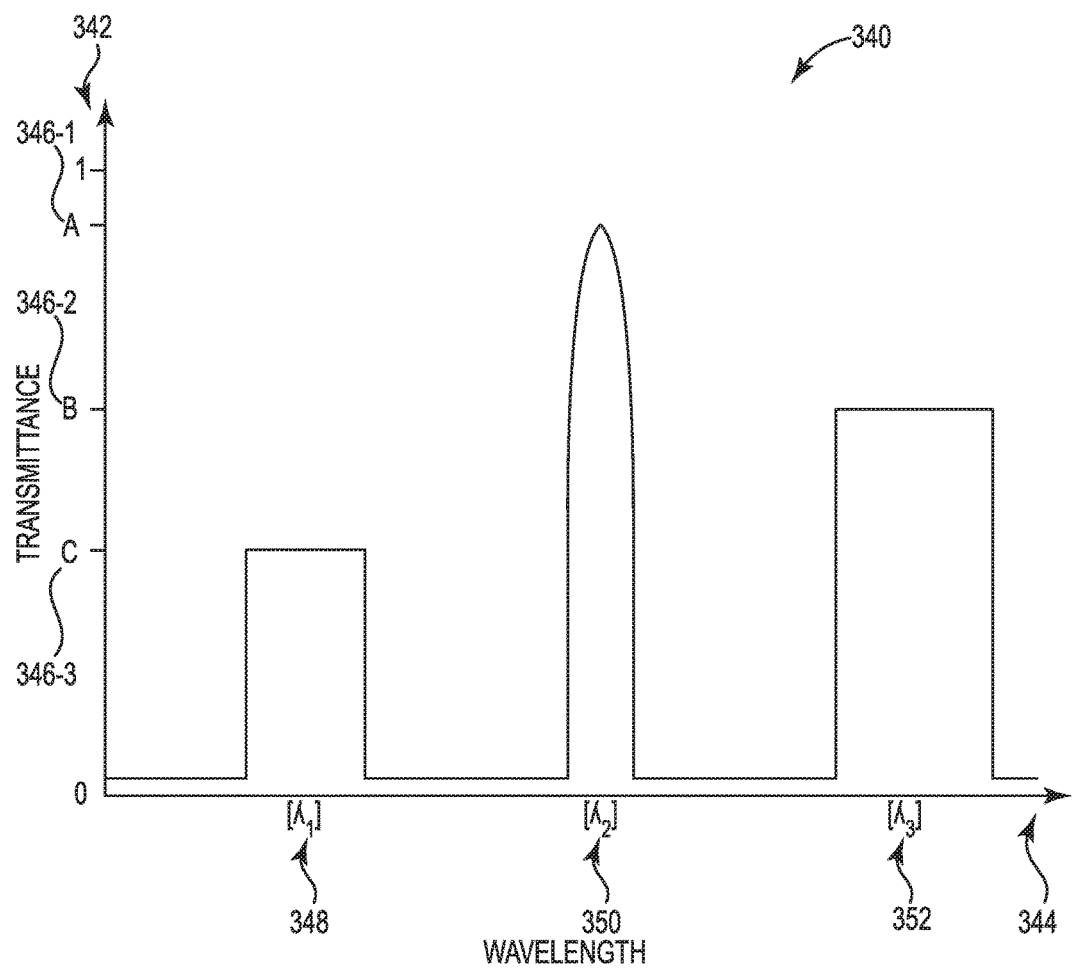
FIG. 3 is an example of a graphical representation of filter response for a system utilizing a multispectral band system consistent with one or more embodiments of the present disclosure.

FIG. 3 is an example of a graphical representation 340 of filter response for a system utilizing a multispectral band system consistent with one or more embodiments of the present disclosure. In some examples, the graphical representation 340 can represent different transmittance values 342 for a number of different wavelengths 348, 350, 352. As described herein, the number of different wavelengths 348, 350, 352 can represent a number of different wavelength ranges that correspond to wavelengths of particular elements or compounds.

In some examples, the graphical representation 340 can include a first wavelength 348. In some examples, the first wavelength 348 can have a first transmittance value 346-3. In some examples, the first transmittance value 346-3 can be lower than a maximum transmittance value (e.g., transmittance value 1, transmittance of 100 percent, etc.). In some examples, the graphical representation 340 can include a second wavelength 350. In some examples, the second wavelength 350 can have a second transmittance value 346-1. In some examples, the graphical representation 340 can include a third wavelength 352. In some examples, the third wavelength 352 can have a third transmittance value 346-2.

In some examples, a total radiance ($R_{tot}$) is sensed as a weighted sum of radiance of each of the number of wavelengths 348, 350, 352. In some examples, the weights are based on the transmittance 346-3, 346-1, 346-2 in graphical representation 340. In some examples, the weights are a factor of the sensor spectral responses and the transmittance 346-3, 346-1, 346-2 in graphical representation 340. Equation 1 can be utilized to represent the total radiance as a function of a radiance ($R_i$) of each of the different wavelengths 348, 350, 352.

$$R_{tot} = a_1 R_1 + a_2 R_2 + \ldots + a_N R_N$$

Equation 1 can be utilized to determine the presence and absence of combinations of radiance ($R_i$) of the different wavelengths 348, 350, 352. Each weighted radiance $a_i R_i$, in absence of other radiance, can have a particular intensity range $I_i$. The design of the weights ensures that the total radiance which is a sum of the combinations of intensity ranges $I_i$ resides in different intensity ranges. A high dynamic range sensor can provide a large intensity range avoiding possible overlap intensity range. Combination of radiances ($R_i$) results in another intensity range. Spatial processing uses pixel intensities from neighboring regions can be applied to estimate each radiance ($R_i$). For example, the 6000-7000 intensity range can correspond to radiation of hydrogen carbon flame (HC) at 4.4 um and the 1000-2000 intensity range can be due to LWIR broadband of background at 300K. In another example, intensity ranges to spectral band pairs can be 3000-4000 to hydrogen flame (H2), 4000-6000 to H2+LWIR background, 7000-9000 to HC+LWIR background, 9000-11000 to HC+H2, and 10000-13000 to HC+H2 flame+LWIR background.

FIG. 4 is an example of a diagram of a computing device 460 for a multispectral band sensor consistent with one or more embodiments of the present disclosure. Computing device 460 can be, for example, an embedded system as described herein, among other types of computing devices.

As shown in FIG. 4, computing device 460 includes a memory 432 and a processor 434 coupled to user interface 436. Memory 432 can be any type of storage medium that can be accessed by processor 434, which performs various examples of the present disclosure. For example, memory 432 can be a non-transitory computer readable medium having computer readable instructions (e.g., computer program instructions) stored thereon.

Processor 434 executes instructions to detect a presence or absence of radiation sources and failure modes in accordance with one or more embodiments of the present disclosure. Processor 434 can also estimate the presence of the combinations of radiance of the wavelengths. Processor 434 can also execute in depth analyses computing the characteristics of the detected items for further decision making. Processor 434 can also format the alerts in form of LED signal, images, or compressed images for user viewing and transmission.

Further, although memory 432, processor 434 and user interface 426 are illustrated as being located in computing device 430, embodiments of the present disclosure are not so limited. For example, memory 432 can also be located internal to another computing resource (e.g., enabling computer readable instructions to be downloaded over the Internet or another wired or wireless connection). Part of the memory can be storage in a cloud storage. Processor 464 can be a cloud computer.

As shown in FIG. 4, computing device 460 can also include a user interface 436. User interface 436 can include, for example, a display (e.g., a screen, an LED light, etc.). The display can be, for instance, a touch-screen (e.g., the display can include touch-screen capabilities). User interface 436 (e.g., the display of user interface 436) can provide (e.g., display and/or present) information to a user of computing device 460.

Additionally, computing device 460 can receive information from the user of computing device 460 through an interaction with the user via user interface 436. For example, computing device 460 (e.g., the display of user interface 436) can receive input from the user via user interface 436. The user can enter the input into computing device 460 using, for instance, a mouse and/or keyboard associated with computing device 460, or by touching the display of user interface 436 in embodiments in which the display includes touch-screen capabilities (e.g., embodiments in which the display is a touch screen).

As used herein, "logic" is an alternative or additional processing resource to execute the actions and/or functions, etc., described herein, which includes hardware (e.g., various forms of transistor logic, application specific integrated circuits (ASICs), etc.), field programmable gate arrays (FPGAs), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for a multispectral band system, comprising:
   a filter comprising a first designated transmittance value for a first wavelength range and a second designated transmittance value for a second wavelength range;
   a sensor to receive transmitted radiation from the filter; and
   a computing device coupled to the sensor to:
      detect any radiation within the first and second wavelength ranges from the received transmitted radiation from the filter; and
      determine a first radiance of the first wavelength and a second radiance of the second wavelength range based on the first designated transmittance value and the second designated transmittance value, wherein the detected radiation in the first wavelength indicates a particular type of radiation source and detected radiation in the second wavelength range indicates one or more other items within a field of view of the received radiation.

2. The system of claim 1, wherein the sensor is a bolometer.

3. The system of claim 1, wherein the received radiation comprises a single image.

4. The system of claim 1, wherein the computing device can identify a corresponding wavelength range of the received transmitted radiation based on a measured radiance of the transmitted radiation.

5. The system of claim 1, wherein the sensor includes at least 16 bit dynamic sensitivity range.

6. The system of claim 1, wherein the radiation source is from a flame.

7. The system of claim 1, wherein the computing device detects a radiance of the radiation source for wavelength ranges corresponding to water, carbon dioxide, mid-wavelength infrared (MWIR), and long wavelength infrared (LWIR).

8. The system of claim 1, wherein the one or more other items detected within the second wavelength range are used to determine whether the system is functioning correctly.

9. The system of claim 1, wherein the computing device detects an existence of a number of radiation sources that utilize a plurality of different fuel types to generate the radiation.

10. The system of claim 1, wherein the computing device detects an existence of a number of flames that utilize a plurality of different fuel types.

11. The system of claim 1, wherein the one or more other items detected within the second wavelength range are used to determine a location of the radiation source detected in the first wavelength range.

12. A filter for a multispectral band system, comprising:
   a substrate having a first coating that allows mid-wavelength infrared (MWIR) to pass through the substrate at a first designated transmittance value and a second coating that allows long wavelength infrared (LWIR) to pass through the substrate at a second designated transmittance value, wherein the first designated transmittance value and second designated transmittance value are utilized by a computing device coupled to the filter to determine a first radiance of the MWIR range and a second radiance of the LWIR range.

13. The filter of claim 12, wherein first coating that allows only wavelength ranges corresponding to one of water or carbon dioxide.

14. The filter of claim 13, wherein MWIR and LWIR have different designated transmittance values.

15. A multispectral band system, comprising:
   a first designated transmittance value for a mid-wavelength infrared (MWIR) range and a second designated transmittance value for a long wavelength infrared (LWIR) range;
   a sensor to receive the MWIR and LWIR passing through the filter; and
   a computing device coupled to the sensor to:
      detect any radiation within the MWIR and LWIR wavelength ranges from the received transmitted radiation from the filter; and
      determine a first radiance of the MWIR range and a second radiance of the LWIR range based on the first designated transmittance value and the second designated transmittance value, wherein the detected radiation in the MWIR wavelength range indicates a particular type of radiation source and detected radiation in the LWIR wavelength range indicates one or more other items within a field of view of the received radiation.

16. The system of claim 15, wherein the particular type of radiation source is a flame.

17. The system of claim 15, wherein the MWIR and LWIR are identified by a corresponding transmittance value.

18. The system of claim 15, wherein the sensor is a bolometer.

19. The system of claim 18, wherein the bolometer simultaneously receives the MWIR and LWIR.

20. The system of claim 15, wherein the computing device coupled to the sensor detects a radiance of the radiation source for wavelength ranges corresponding to at least one of water and carbon dioxide.

* * * * *